United States Patent [19]
Galburt

[11] Patent Number: 5,352,962
[45] Date of Patent: Oct. 4, 1994

[54] BRUSHLESS POLYPHASE REDUCED FORCE VARIATION MOTOR

[75] Inventor: Daniel N. Galburt, Wilton, Conn.

[73] Assignee: SUG Lithography Systems, Inc., Wilton, Conn.

[21] Appl. No.: 48,860

[22] Filed: Apr. 19, 1993

[51] Int. Cl.⁵ .......................................... H02K 41/02
[52] U.S. Cl. .................................. 318/687; 318/135; 318/254
[58] Field of Search ............... 318/254, 138, 439, 687, 318/135

[56] References Cited

U.S. PATENT DOCUMENTS

| | | | |
|---|---|---|---|
| 3,940,676 | 2/1976 | Dudley | 318/612 |
| 4,509,001 | 4/1985 | Wakabayashi et al. | 318/687 |
| 4,546,294 | 10/1985 | Ban et al. | 318/254 X |
| 4,645,991 | 2/1987 | Ban et al. | 318/254 X |
| 4,658,190 | 4/1987 | Miyazaki et al. | 318/254 |
| 5,182,500 | 1/1993 | Shimada | 318/254 |
| 5,270,631 | 12/1993 | Takahashi et al. | 318/640 X |

*Primary Examiner*—Bentsu Ro
*Attorney, Agent, or Firm*—Paul A. Fattibene; Arthur T. Fattibene

[57] ABSTRACT

A control for brushless motors having polyphase moving coil armatures, sinusoidal commutation, and integral linear hall effect commutation sensors providing a correction signal such that the sum of the squares of the commutation signals is maintained at a predetermined constant. A sum squared correction means is used to provide an error correction signal feedback to magnetic field sensors or hall effect commutation sensors used to provide a sinusoidal commutation signal for each phase of a three phase moving coil armature such that the sum of the squares of each signal representative of the commutation signal is forced to be a predetermined constant. This has the effect of substantially reducing the motor force or torque variations typically occurring with such brushless electric motors having sinusoidal commutation. The motor force or torque variations are due in part to the hall effect sensor or magnetic field sensor gain and offset errors.

1 Claim, 3 Drawing Sheets

BRUSHLESS POLYPHASE REDUCED FORCE VARIATION MOTOR

FIELD OF THE INVENTION

The present invention relates generally to the control of polyphase motors and more particularly to a control for a motor for reducing force or torque variations and improving motion control.

BACKGROUND OF THE INVENTION

Electric motors are used in many applications for the movement of various mechanical devices. There are many different kinds of electric motors. For example, alternating current synchronous and reduction motors, direct current shunt, series or compound motors.

One type of electric linear motor that is used in precision applications is the brushless motor with permanent magnet stators, polyphase moving coil armatures, sinusoidal commutation, and hall effect commutation sensors. These types of electric linear motors do not have commutation brushes or any other physical contact between the stationary and moving components. Therefore, these motors are preferably used in clean room environments and in the manufacture of semiconductors where a clean environment and precision motion control is required.

While these types of electric motors accomplish the purposes for which they have been intended, there is an ever increasing need to improve the operation and precision control of such electric motors so as to enhance their operation and application to the precision motion control requirements of different manufacturing applications, such as semiconductor manufacturing.

SUMMARY OF THE INVENTION

The present invention is directed to an improved control for brushless electric linear motors with permanent magnet stators, polyphase moving coil armatures, sinusoidal commutation, and hall effect commutation sensors. A reduction in motor force or torque variations is achieved by continuously adjusting the scale of the hall effect commutation signals to hold the sum of the squares of all the polyphase commutation signals constant. This is accomplished by either an analog feedback circuit or a digital computer circuit.

Accordingly, it is an object of the present invention to reduce the motor force or torque variation in an electric linear motor.

It is an advantage of the present invention that no modification of the mechanical or magnetic design of existing electric motors is needed.

It is a feature of the present invention that the sum of the squares of the commutation signals is held constant.

These and other objects, advantages, and features will become readily apparent in view of the following more detailed description.

DETAILED DESCRIPTION OF THE PREFERRED EMBODIMENTS

Figure 1:
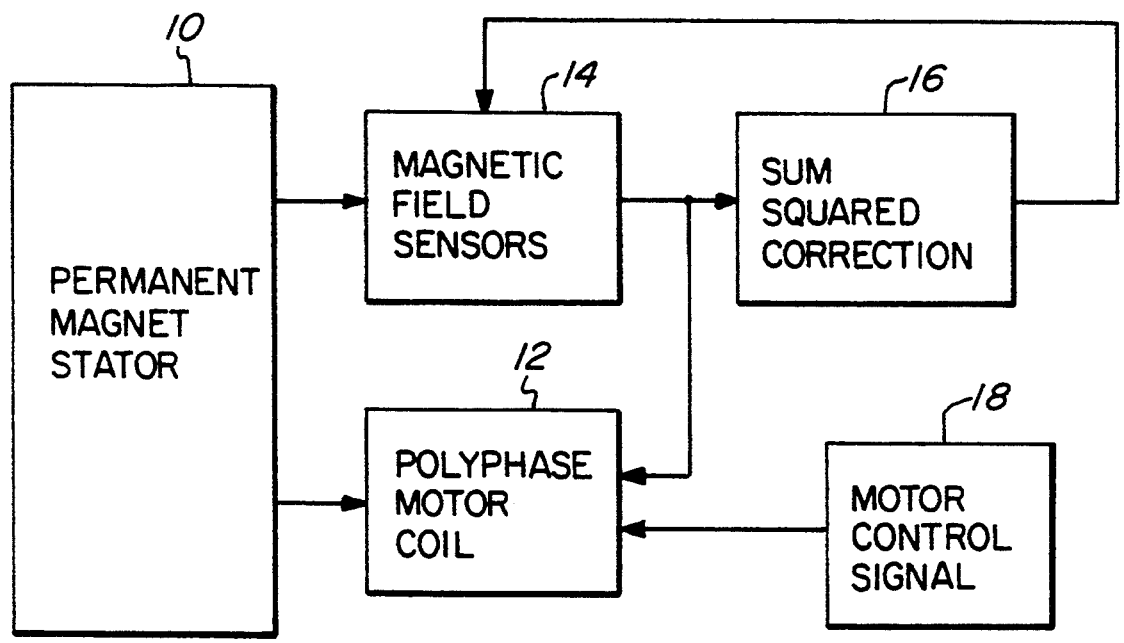
FIG. 1 is a simplified block diagram illustrating the present invention.

FIG. 1 is a simplified block diagram illustrating the present invention. Permanent magnet stator 10 is magnetically coupled to polyphase motor coil 12 and magnetic field sensors 14. Hall effect sensors may be used for the magnetic field sensors 14. The function of the magnetic field sensors 14 is to generate an output voltage or signal proportional to magnetic field strength and current fed to the sensor. The magnetic field sensors 14 are coupled to a sum squared correction means 16 and polyphase motor coil 12. The magnetic field sensors 14 provide commutation signals to the polyphase motor coil 12. The sum squared correction means 16 receives the commutation signals from the magnetic field sensors 14 and generates a sum of the squares of the commutation signals from the magnetic field sensors 14. The sum squared correction means 16 then provides a correction signal which is fed back to the magnetic field sensors 14. The purpose of the correction signal is to assure that the sum of the squares of the signals from the magnetic field sensors 14 always results in a predetermined constant. The corrected or modified signals from the magnetic field sensors 14 are then applied to the polyphase motor coil 12. The corrected magnetic field sensor 14 signals are then modulated by the motor control signal 18, thereby driving the electric motor. The modified or corrected commutation signals provided by the magnetic field sensors 14 result in a substantial reduction in the force or torque variations of the electric motor. These force or torque variations are commonly due to gain and offset errors of the magnetic field sensors 14. The use of the sum squared correction means 16 for the commutation signals provided by magnetic field sensors 14 in a brushless polyphase moving coil armature motor can be applied to both linear motors and rotary motors. In both linear and rotary motors, the motor force or torque variations are significantly reduced. Computer models and actual tests of the present invention have demonstrated that in at least two different linear motor designs, motor force variation have been reduced by at least a factor of two. This reduction of motor force variation was unexpected. Additionally, the theoretical rationale for a reduction of this magnitude has not yet been fully established.

Figure 2:
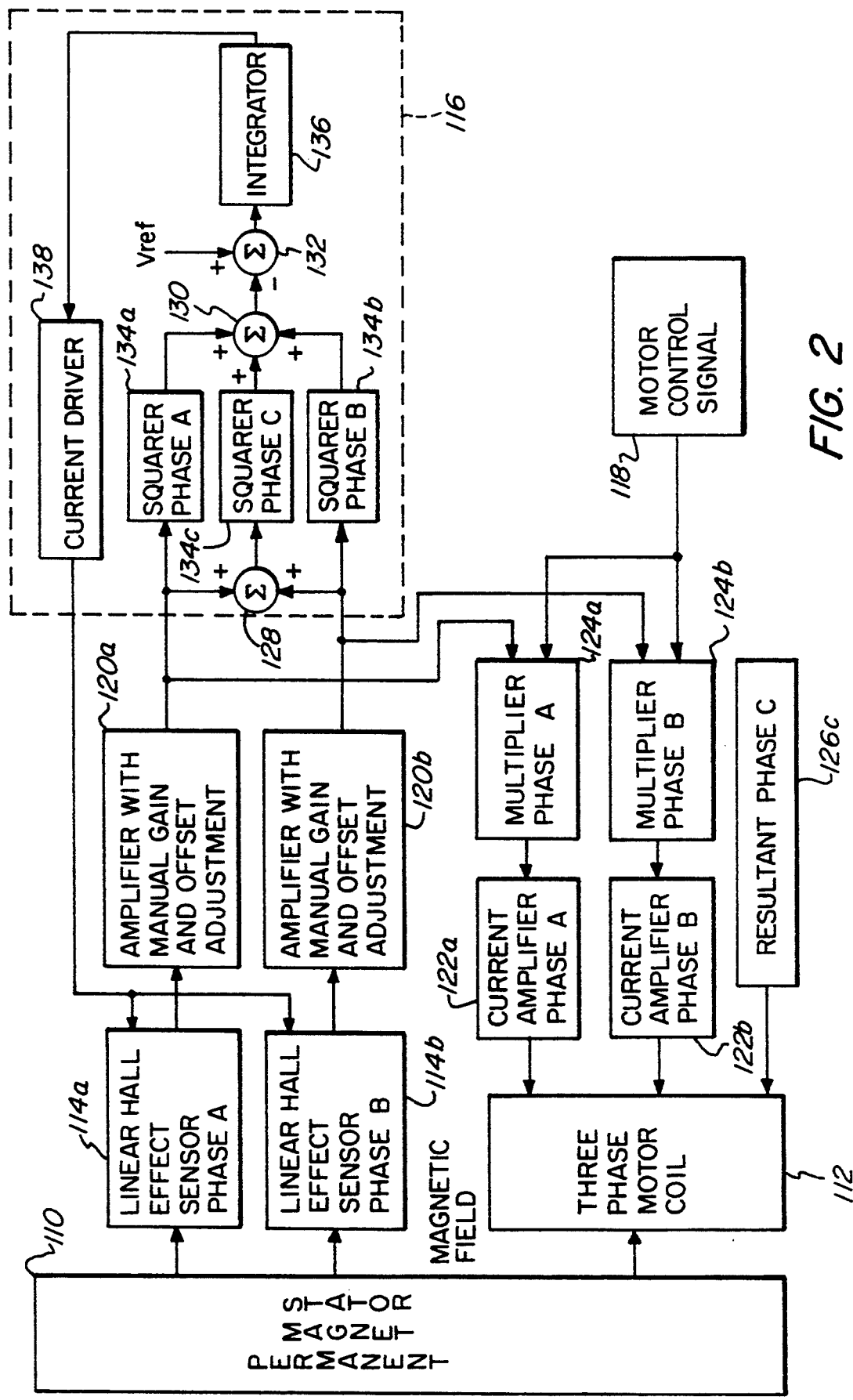
FIG. 2 is a block diagram of an embodiment of the present invention.

FIG. 2 illustrates in block form another embodiment of the present invention. Permanent magnet stator 110 creates a magnetic field. The magnetic field created by stator 110 interacts with a magnetic field generated in three phase motor coil 112. Linear hall effect sensors 114a and 114b are used to detect the resultant magnetic field strength. Linear hall effect sensor 114a is associated with phase A of the three phase motor coil 112 and linear hall effect sensor 114b is associated with phase B of the three phase motor coil 112. The output of the linear hall effect sensors 114a and 114b is fed to two amplifiers with manual gain and offset adjustments 120a and 120b respectively. The output of the two amplifiers with manual gain and offset adjustments 120a and 120b are fed to a sum squared correction means 116 and to two multipliers 124a and 124b. Multiplier 124a is associated with phase A and multiplier 124b is associated with phase B. A motor control signal 118 is provided to both multipliers 124a and 124b. The multipliers 124a and 124b multiply the respective signals, which are commutation signals, from the amplifiers with manual gain and offset adjustments 120a and 120b with the motor signal control signal 118. The resultant multiplied signals from multipliers 124a and 124b are then supplied to current amplifiers 122a and 122b respectively. Current amplifier 122a is associated with phase A and current amplifier 122b is associated with phase B. The output of current amplifiers 122a and 122b are input into the three phase motor coil 112. Resultant phase C means 126c provides the resultant phase C to the three phase motor coil 112. The resultant phase C can readily be calculated from phase A and phase B information. It is common practice within the art to provide two phases of a three phase motor, and calculate the resulting third phase from information provided by the other two phases. As a result of the current provided at the three different phases to the three phase motor coil 112, a magnetic field is created that interacts with the stator 110, causing motion therebetween. The sum squared correction means 116 receives signals from the amplifiers with magnetic gain and offset adjustments 120a and 120b, and provides feedback to the linear hall effect sensors 114a and 114b. The function of the sum squared correction means 116 is to assure that the sum of the squares of the commutation signal for the three different phases, phase A, phase B, and phase C, used to drive the three phase motor coil 112, is always a predetermined constant. The sum squared correction means 116 accomplishes this function by receiving the commutation signals for phase A and phase B from the amplifiers with manual gain and offset adjustments 120a and 120b. These two signals are squared by squarer 134a and squarer 134b respectively. Squarer 134a squares the commutation signal for phase A and square 134b squares the commutation signal for phase B. The commutation signal for resultant phase C is determined by summing the signal for phase A and the signal for phase B by summer 128. The resultant signal from summer 128 is then squared by squarer 134c. The squared commutation signals for phase A, phase B, and phase C are output from squares 134a, 134b, 134c and are summed by summer 130. This resulting sum squared signal for phase A, phase B and phase C is subtracted from a reference voltage $V_{ref}$ by summer 132. The resulting difference is integrated by integrator 136 into an error voltage which is applied to current driver 138 and subsequently to the two linear hall effect sensors 114a and 114b. Thereby, the output of the linear hall effect sensors 114a and 114b are adjusted such that the sum of the squares of the commutation signals for phase A, phase B, and phase C is maintained at a predetermined constant. The stable feedback loop thus formed by the sum squared correction means 116 assures that the sum of the squares of the three commutation signals for the three phases used to excite the three phase motor coil 112 is a constant. This results in a substantial reduction in motor force or torque variations caused in part by hall effect sensor gain and offset errors.

Figure 3:
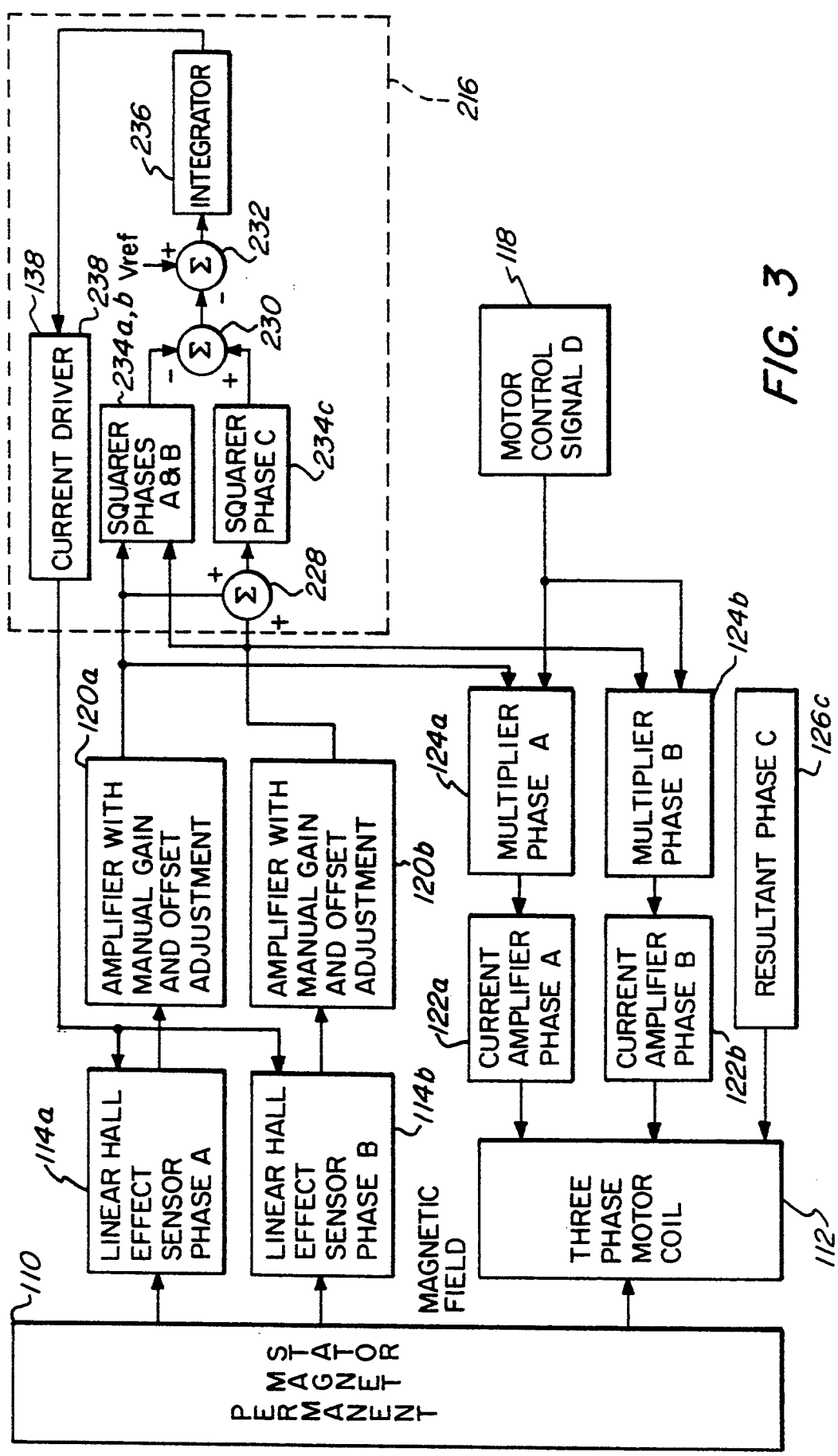
FIG. 3 is a block diagram of another embodiment of the present invention.

FIG. 3 is a block diagram illustrating another embodiment of the present invention. This embodiment is similar to that illustrated in FIG. 2, with the exception of the sum squared correction means 216. The sum squared correction means 216 in the embodiment illustrated in FIG. 3 calculates the sum of the squares of the commutation signal for the three phases differently. However, the result of assuring that the sum of the squares of the commutation signals for the three phases is held to a predetermined constant is the same as the embodiment illustrated in FIGS. 1 and 2. With reference to FIG. 3, and in particular the sum squared correction means 216, therein contained is squarer 234ab which receives and squares the commutation signals for phases A and B. Summer 228 receives commutation signals for phases A and B, sums them, and supplies the summed signal to squarer 234c. This squared signal is for phase C. The output from squares 234ab and 234c are summed with summer 230. The resulting output is subtracted from reference $V_{ref}$ by summer 232. The resulting signal is integrated by integrator 236 resulting in error voltage which is converted to a current by current driver 138 and provided as a feedback signal to linear hall effect sensors 114a and 114b. This feedback signal, as in the prior two embodiments, has the effect of forming a stable feedback loop that forces the sum of the squares of the three signals representative of the commutation signals to be a predetermined constant. This results in a substantial reduction in the motor force or torque variations, due in part to hall effect sensor gain and offset errors.

The present invention can be implemented in digital form by digitizing the unmodulated hall effect signals and providing a numerical adjustment such that the square of the signals for the three commutation phases is always a constant. This can be readily accomplished through the following sequence of the below mathematical operations.

$$S = A_H{}^2 + B_H{}^2 + (A_H + B_H)^2$$

$$A_M = \frac{A_H}{\sqrt{S}}$$

$$B_M = \frac{B_H}{\sqrt{S}}$$

$$A_C = KA_MD$$

$$B_C = KB_MD$$

Where:
  S = sum squared value
  $A_H$ = digitized signal from Hall effect sensor for phase A
  $B_H$ = digitized signal from Hall effect sensor for phase B
  $A_M$ = modified or corrected digitized signal for phase A
  $B_M$ = modified or corrected digitized signal for phase B
  $A_C$ = the signal for the motor coil for phase A
  $B_C$ = the signal for the motor coil for phase B
  K = a scaling constant
  D = motor control signal This sequence can be continued in an endless loop, assuring that the sum squared value is constantly adjusted so that the sum of the squares always equals a predetermined constant.

From the above, it should readily be appreciated that the present invention significantly reduces the motor force or torque variations found in brushless motors using permanent magnet stators and three phase moving coil armatures having sinusoidal commutation and integral linear hall sensors for providing commutation signals. Thereby, the precision control of devices using these types of electric motors is greatly increased, facilitating their use in such manufacturing operations as semiconductor production.

Although the preferred embodiments have been illustrated and described, it will be obvious to those skilled in the art that various modifications may be made without departing from the spirit or scope of this invention.

What is claimed is:

1. A brushless three phase electric linear motor having sinusoidal commutation comprising:
   a fixed permanent magnet stator;
   a first linear hall effect sensor providing a first commutation signal output associated with a first phase;
   a second linear hall effect sensor providing a second commutation signal output associated with a second phase;
   third commutation signal means, associated with said first and second commutation signal outputs, for determining a third commutation signal output associated with a third phase;
   squaring means, associated with the first commutation signal output, the second commutation signal output, and the third commutation signal output, for providing a signal representative of the square of each of the first commutation signal output, the second commutation signal output, and the third commutation signal output;
   summing means, associated with said squaring means, for providing a signal representative of the sum of the squares of each of the first commutation signal output, the second commutation signal output, and the third commutation signal output;
   error signal means, associated with said summing means and a predetermined reference signal, for providing an error feedback signal to said first and second linear hall effect sensors so that the signal representative of the sum of the squares is maintained at a predetermined constant;
   first amplifier means, associated with said first linear hall effect sensor, for amplifying the first commutation signal output, said first amplifier means having manual gain and offset adjustments;
   second amplifier means, associated with said second linear hall effect sensor, for amplifying the second commutation signal output, said second amplifier means having manual gain and offset adjustments;
   a motor control signal means for providing a motor control signal;
   first multiplier means, associated with said first amplifier means and said motor control signal means, for multiplying the amplified first commutation signal output with the motor control signal;
   second multiplier means, associated with said second amplifier means and said motor control signal means, for multiplying the amplified second commutation signal output with the motor control signal;
   a first current amplifier receiving a first multiplied signal from said first multiplier means and amplifying the first multiplied signal;
   a second current amplifier receiving a second multiplied signal from said second multiplier means and amplifying the second multiplied signal;
   resultant phase means, associated with the first and second phases, for providing an output for the third phase; and
   a three phase moving motor coil armature receiving output from said first and second current amplifiers and said resultant phase means,
   whereby linear motor force variation is substantially reduced.

* * * * *

UNITED STATES PATENT AND TRADEMARK OFFICE
CERTIFICATE OF CORRECTION

PATENT NO.     : 5,352,962
DATED          : October 4, 1994
INVENTOR(S)    : Daniel N. Galburt It is certified that error appears in the above-identified patent and that said Letters Patent is hereby corrected as shown below:

On the title page, item [73] Assignee: "SUG Lithography Systems, Inc." should read -- SVG Lithography Systems, Inc. --.

Signed and Sealed this

Thirteenth Day of December, 1994

Attest:

BRUCE LEHMAN

*Attesting Officer*                *Commissioner of Patents and Trademarks*